United States Patent
Imanishi et al.

(10) Patent No.: US 8,795,915 B2
(45) Date of Patent: Aug. 5, 2014

(54) FUEL CELL SYSTEM

(75) Inventors: Hiroyuki Imanishi, Toyota (JP); Kota Manabe, Toyota (JP); Yoshiaki Naganuma, Nissin (JP); Tomoya Ogawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 587 days.

(21) Appl. No.: 12/810,131

(22) PCT Filed: Dec. 18, 2008

(86) PCT No.: PCT/JP2008/073056
§ 371 (c)(1),
(2), (4) Date: Jun. 22, 2010

(87) PCT Pub. No.: WO2009/084448
PCT Pub. Date: Jul. 9, 2009

(65) Prior Publication Data
US 2010/0266916 A1    Oct. 21, 2010

(30) Foreign Application Priority Data

Dec. 27, 2007 (JP) ................. 2007-337835

(51) Int. Cl.
*H01M 8/04* (2006.01)
(52) U.S. Cl.
USPC ................ 429/429; 429/430; 429/443
(58) Field of Classification Search
USPC ................................ 429/400–535
See application file for complete search history.

(56) References Cited

U.S. PATENT DOCUMENTS

| | | | |
|---|---|---|---|
| 2002/0051899 A1* | 5/2002 | Keskula et al. | 429/17 |
| 2006/0234094 A1* | 10/2006 | Sakai | 429/24 |
| 2009/0148736 A1 | 6/2009 | Manabe et al. | |
| 2010/0055522 A1 | 3/2010 | Manabe et al. | |
| 2010/0068575 A1 | 3/2010 | Manabe et al. | |

FOREIGN PATENT DOCUMENTS

| | | |
|---|---|---|
| JP | 2002-313388 A | 10/2002 |
| JP | 2003-504807 A | 2/2003 |
| JP | 2003-317765 A | 11/2003 |
| JP | 2004-30979 A | 1/2004 |
| JP | 2005-30948 A | 2/2005 |
| JP | 2005-332702 A | 12/2005 |
| JP | 2006-73501 A | 3/2006 |
| JP | 2007-26933 A | 2/2007 |

(Continued)

*Primary Examiner* — Kenneth Douyette
*Assistant Examiner* — James Lee
(74) *Attorney, Agent, or Firm* — Kenyon & Kenyon LLP (57) ABSTRACT

Provided is a fuel cell system capable of making a shift of an operation state while optically controlling an output voltage and an output voltage of a fuel cell. When an ECU judges that the time when an operation should be shifted from a low-efficiency operation to a normal operation has come, the ECU performs, as preprocessing prior to a shift to a ΔV control, processing of increasing an oxidant gas supplied to a fuel cell stack by a predetermined amount. After this processing, the ECU detects output power, calculates an output power deviation, and then compares the output power deviation with a set deviation threshold. When the output power deviation exceeds the deviation threshold, the ECU carries out the ΔV control, and then carries out an I-V control. Meanwhile, when the output power deviation does not exceed the deviation threshold, the ECU judges that the time when the ΔV control is carried out has not come yet, and automatically starts the I-V control without carrying out the ΔV control.

6 Claims, 8 Drawing Sheets

(56) References Cited

FOREIGN PATENT DOCUMENTS

| JP | 2007-149595 A | 6/2007 |
| JP | 2007-157478 A | 6/2007 |
| JP | 2007-280804 A | 10/2007 |
| JP | 2008-269813 A | 11/2008 |
| WO | WO 2008/047603 A1 | 4/2008 |
| WO | WO 2008/114759 A1 | 9/2008 |
| WO | WO 2008/114761 A1 | 9/2008 |

* cited by examiner

<VOLTAGE/CURRENT SWITCHING MAP>

| OUTPUT CURRENT | OUTPUT VOLTAGE |
|---|---|
| $0 \leqq I_{fc} < I_{fc1}$ | $V_{fc} = V_{fc1}$ |
| $I_{fc1} \leqq I_{fc}$ | $V_{fc} = V_{fc2} (< V_{fc1})$ |

FUEL CELL SYSTEM

This is a 371 national phase application of PCT/JP2008/073056 filed 18 Dec. 2008, which claims priority to Japanese Patent Application No. 2007-337835 filed 27 Dec. 2007, the contents of which are incorporated herein by reference.

FIELD OF THE INVENTION

The present invention relates to a fuel cell system, and particularly relates to a fuel cell system which is operated and controlled in consideration of charge/discharge amounts with respect to a capacitance component of a fuel cell.

BACKGROUND ART

A fuel cell system is a power generation system in which fuel is oxidized through an electrochemical process, thereby directly converting energy discharged as a result of the resultant oxidation reaction into electrical energy, and the fuel cell system has a stack structure which is constituted from a plurality of membrane/electrode assemblies each having a configuration in which an electrolyte membrane for selectively transporting hydrogen ions is sandwiched, on both of its sides, by a pair of electrodes formed of a porous material. In particular, a solid polymer electrolyte fuel cell, in which a solid polymer membrane is used as an electrolyte, can easily be reduced in size at a low cost and has a high output density, and therefore is expected to be used as a vehicle-mounted power source.

In this type of fuel cell, the optimum temperature range for power generation is generally considered to be from 70 to 80° C. However, in, e.g., a cold environment, a long time might be required from when the fuel cell is started until the temperature of the fuel cell reaches the optimum temperature range. Therefore, various warm-up systems have been under consideration. For example, JP2004-030979 A discloses a method in which a low-efficiency operation with a low power generation efficiency compared with a normal operation is carried out to control the self-heating power of a fuel cell in order to warm up the fuel cell. This method attains a self warm-up of the fuel cell, and therefore, a warm-up device does not need to be provided, which is excellent in terms of convenience.

Patent Document 1: Japanese laid-open patent publication No. 2004-030979

DISCLOSURE OF THE INVENTION

Problem to be Solved by the Invention

Meanwhile, when a warm-up under a low-efficiency operation is ended to make a shift to a normal operation, an output voltage and an output current of a fuel cell need to be varied while the required power is considered in accordance with the shift of this operation state. However, no prior art exists that clarifies how the output voltage and output current of the fuel cell should be controlled in accordance with such a shift of the operation state.

The present invention has been made to solve the above-described circumstances, and has an object to provide a fuel cell system capable of making a shift of an operation state while optimally controlling an output voltage and an output voltage of a fuel cell.

Means for Solving the Problem

In order to solve the above-described problem, the present invention provides a fuel cell system that warms up a fuel cell by carrying out a low-efficiency operation with a low power generation efficiency compared with a normal operation, including: a judgment unit for making a judgment on whether or not a setting condition is satisfied when shifting an operation from the low-efficiency operation to the normal operation, in which, when the setting condition is not satisfied, the operation is shifted from the low-efficiency operation, through a $\Delta V$ control, to the normal operation by performing the $\Delta V$ control, in which an output voltage of the fuel cell is controlled to achieve system required power while considering charge/discharge amounts with respect to a capacitance component of the fuel cell, whereas when the setting condition is satisfied, the operation is automatically shifted from the low-efficiency operation, not through the $\Delta V$ control, to the normal operation.

With such a configuration, after the warm-up under the low-efficiency operation becomes unnecessary, the operation is automatically shifted from the low-efficiency operation to the normal operation when the setting condition is satisfied. Therefore, for example, the problem that, even after the warm-up under the low-efficiency operation becomes unnecessary, the shift to the normal operation cannot be performed, thereby resulting in a continuation of the low-efficiency operation with poor power generation efficiency, can be prevented.

Meanwhile, when the setting condition, is not satisfied, the operation is shifted from the low-efficiency operation to the normal operation through the $\Delta V$ control by performing the $\Delta V$ control, in which an output voltage of the fuel cell is controlled to achieve system required power while considering charge/discharge amounts with respect to a capacitance component of the fuel cell. Therefore, for example, the problems of the insufficiency of the power supplied to an external load (battery, etc.) and the supply of excessive power the external load can be prevented.

Here, with the above configuration, it is preferable that there is provided the above fuel system further including: a supply oxidant gas control unit for increasing an oxidant gas supplied to the fuel cell by a predetermined amount when shifting the operation from the low-efficiency operation to the normal operation; and a derivation unit for deriving an output power deviation of the fuel cell by detecting output power of the fuel cell before and after the increase of the oxidant gas, in which, when the derived output power deviation of the fuel cell is below a set power threshold, the judgment unit judges that the setting condition is satisfied.

With the above configuration, it is preferable that, when the derived output power deviation of the fuel cell is below the set power threshold for or longer than a predetermined time, the judgment unit judges that the setting condition is satisfied.

With the above configuration, it is preferable that there is provided the above fuel system further including: a detection unit for detecting a related temperature of the fuel cell; and a shift determination unit for determining whether or not the operation should be shifted from the low-efficiency operation to the normal operation based on the detected related temperature, in which, when the shift determination unit determines that the operation should be shifted from the low-efficiency operation to the normal operation, the judgment unit makes a judgment on whether or not the setting condition is satisfied.

The present invention provides another fuel cell system that warms up a fuel cell by carrying out a low-efficiency operation with a low power generation efficiency compared with a normal operation, including: a judgment unit for making a judgment on whether or not an output voltage of the fuel cell should be changed during the low-efficiency operation;

and a voltage control unit for, when it is judged that the output voltage should be changed, changing the output voltage by performing a Δ control, in which the output voltage of the fuel cell is controlled to achieve system required power while considering charge/discharge amounts with respect to a capacitance component of the fuel cell.

With the above configuration, it is preferable that there is provided the above fuel cell system further including a storage unit for storing exhaust hydrogen concentration information representing a relationship between an output voltage and an output current of the fuel cell which satisfies an exhaust-hydrogen-concentration lower limit, in which the judgment unit makes a judgment on whether or not the output voltage of the fuel cell should be changed during the low-efficiency operation based on the exhaust hydrogen concentration information.

Effect of the Invention

According to the present invention, an operation state can be shifted while optimally controlling an output voltage and an output voltage of the fuel cell.

BEST MODE FOR CARRYING OUT THE INVENTION

A. First Embodiment

Figure 1:
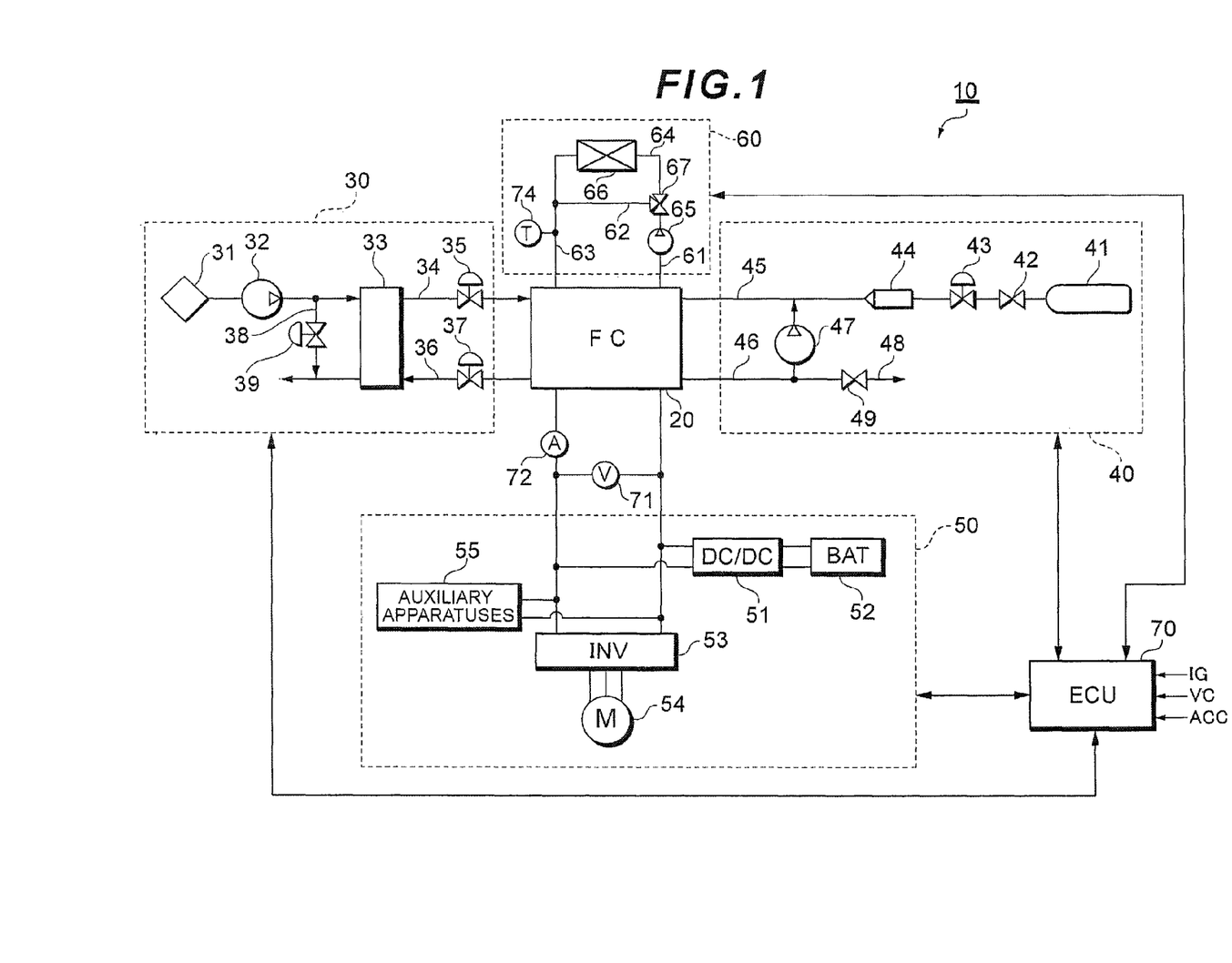
FIG. 1 is a configuration diagram showing a fuel cell system in a first embodiment.

Embodiments of the present invention will be described below with reference to the attached drawings. FIG. 1 illustrates a system configuration of a fuel cell system 10 mounted on a vehicle according to this embodiment. In the descriptions below, fuel cell hybrid vehicles (FCHV) are assumed as an example of vehicles, but the fuel cell system may be applied to electric vehicles and hybrid vehicles. Also, the fuel cell system may, be applied not only to the vehicles but also to various mobile objects (e.g., ships, airplanes and robots) and stationary power supplies as well as portable fuel cell systems.

The fuel cell system 10 functions as a vehicle-mounted power supply system to be mounted on a fuel cell vehicle, and is provided with: a fuel cell stack which generates electric power upon the supply of reaction gases (fuel gas and oxide gas); an oxidant gas supply system 30 for supplying air serving as an oxidant gas to the fuel cell stack 20; a fuel gas supply system 40 for supplying a hydrogen gas serving as a fuel gas to the fuel cell stack 20; a power system 50 for controlling charge/discharge of power; a cooling system 60 for cooling the fuel cell stack 20; and a controller (ECU) 70 for controlling the entire system.

The fuel cell stack 20 is a solid polymer electrolyte cell stack in which a plurality of cells is stacked in series. The oxidization reaction of below formula (1) occurs at an anode, and the reduction reaction of below formula (2) occurs at a cathode. The electromotive reaction of below formula (3) occurs in the entire fuel cell stack 20.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

Attached to the fuel cell stack 20 are a voltage sensor 71 for detecting an output voltage of the fuel cell stack 20 and a current sensor 72 for detecting a generated current.

The oxidant gas supply system 30 includes an oxidant gas path 34 in which oxidant gas supplied to a cathode of the fuel cell stack 20 flows and an oxidant-off gas path 36 in which oxidant-off gas exhausted from the fuel cell stack 20 flows. The oxidant gas path 34 is provided with: an air compressor 32 for taking in oxidant gas from air through a filter 31; a humidifier 33 for humidifying the oxidant gas supplied to the cathode of the fuel cell stack 20; and a throttle valve 35 for adjusting an oxidant gas supply amount. The oxidant-off gas path 36 is provided with a backpressure regulating valve 37 for regulating an oxidant gas supply pressure and the humidifier 33 for exchanging moisture between oxidant gas (dry gas) and oxidant-off gas (wet gas).

Arranged between the oxidant gas path 34 and the oxidant-off gas path 36 are: a bypass path 38 for connecting these gas paths to each other while bypassing the fuel cell stack 20; and a bypass valve 39 for adjusting the flow rate of the oxidant gas flowing in the bypass path 38. The bypass valve 39 is closed under normal conditions, and is opened during voltage drop processing described below. The bypass path 38 and the bypass valve 39 function as a bypass unit for adjusting the flow rate of bypass air.

The fuel gas supply system 40 includes: a fuel gas supply source 41; a fuel gas path 45 in which the fuel gas supplied from the fuel gas supply source 41 to the anode of the fuel cell stack 20 flows; a circulation path 46 for returning the fuel-off gas discharged from the fuel cell stack 20 to the fuel gas path 45; a circulation pump 47 for pumping the fuel-off gas in the circulation path 46 to the fuel gas path 43; and an exhaust/drain path 48 which has a branch connection with the circulation path 47.

The fuel gas supply source 41 is constituted by a high-voltage hydrogen tank, hydrogen absorbing alloys, etc., and stores hydrogen gas at a high pressure (e.g., 35 MPa to 70 MPa). When a cutoff valve 42 is opened, the fuel gas is flown to the fuel gas path 45 from the fuel gas supply source 41. The pressure of the fuel gas is reduced to approximately, e.g., 200 kPa by a regulator 43 or an injector 44, and the resultant gas is supplied to the fuel cell stack 20.

Note that the fuel gas supply source 41 may be constituted by a reformer for producing hydrogen-enriched reformed gas from hydrocarbon fuel and a high-pressure gas tank which brings the reformed gas produced by the reformer into a high-pressure state and stores the resultant gas.

The regulator 43 is a device for regulating a pressure on the upstream side (primary pressure) to a preset secondary pressure, and is constituted by, e.g., a mechanical pressure reducing valve for reducing the primary pressure. The mechanical pressure reducing valve has a casing in which a backpressure chamber and a pressure regulating chamber are formed while being separated by a diaphragm, and has a configuration in which, with the backpressure in the backpressure chamber, the primary pressure is reduced to a predetermined pressure in the pressure regulating chamber, thereby obtaining the secondary pressure.

The injector 44 is an electromagnetic drive type on-off valve having a configuration in which a valve body is directly driven with an electromagnetic driving force with a predetermined drive period so as to be separated from a valve seat, thereby controlling a gas flow rate or gas pressure. The injector 44 is provided with a valve seat having an injection hole through which gas fuel such as fuel gas is injected, and is also provided with: a nozzle body for supplying and guiding the gas fuel to the injection hole; and a valve body held to be contained in a movable manner in an axial direction (gas flow direction) with respect to the nozzle body.

The exhaust/drain path 48 is provided with an exhaust/drain valve 49. The exhaust/drain valve 49 operates in accordance with commands from the controller 70, thereby discharging the fuel-off gas containing impurities and water in the circulation path 46. By opening the exhaust/drain valve 49, the concentration of the impurities contained in the fuel-off gas in the circulation path 46 decreases, which enables the hydrogen concentration of the fuel-off gas circulating in a circulation system to increase.

The fuel-off gas discharged through the exhaust/drain valve 49 is mixed with the oxidant-off gas flowing in the oxidant-off gas path 34, and the mixture is diluted with a diluter (not shown). The circulation pump 47 circulates and supplies the fuel-off gas in the circulation system to the fuel cell stack 20 via a motor drive.

The power system 50 is provided with a DC/DC converter 51, a battery 52, a traction inverter 53, a traction motor 54 and an auxiliary machine 55. The DC/DC converter 51 has a function of raising a direct-current voltage supplied from the battery 52 and outputting the resultant direct-current voltage to the traction inverter 53, and has a function of lowering the voltage of direct-current power generated by the fuel cell stack 20 or the voltage of regenerated power collected by the traction motor 54 via regeneration restriction operation and discharging the battery 52 with the resultant power. These functions of the DC/DC converter 51 attain control over the charge/discharge of the battery 52. Also, voltage conversion control performed by the DC/DC converter 51 controls an operation point (output voltage and output current) of the fuel cell stack 20.

The battery 52 functions as a storage source of surplus power, a storage source of regenerated energy during regeneration restriction, and an energy buffer during a load variation as a result of acceleration or deceleration of a fuel cell vehicle. The battery 52 is preferably constituted by a secondary battery such as a nickel/cadmium battery, a nickel/hydrogen battery, or a lithium secondary battery.

The traction inverter 53 is, for example, a PWM inverter driven by a pulse width modulation method. In accordance with control commands from the controller 70, the traction inverter 53 converts a direct-current voltage output from the fuel cell stack 20 or the battery 52 into a three-phase AC voltage, thereby controlling a rotation torque of the traction motor 54. The traction motor 54 is, for example, a three-phase AC motor, and constitutes a power source of the fuel cell vehicle.

The auxiliary machine 55 is a generic name of motors arranged in the respective portions in the fuel cell system 10 (e.g., power sources such as pumps), inverters for driving these motors, and various vehicle-mounted auxiliary machines (e.g., an air compressor, injector, cooling water circulation pump and radiator).

The cooling system 60 is provided with: coolant paths 61, 62, 63, and 64 for flowing a coolant circulating inside the fuel cell stack 20; a circulation pump 65 for compressing and transferring the coolant; a radiator 66 for exchanging heat between the coolant and external air; a three-way valve 67 for performing switching of coolant circulation paths; and a temperature sensor 74 for detecting a coolant temperature. During a normal operation after the completion of a warm-up operation, the three-way valve 67 is controlled to be opened or closed so that the coolant flowing out of the fuel cell stack 20 flows through the coolant paths 61 and 64, is cooled by the radiator 66, then flows through the coolant path 63, and flows into the fuel cell stack 20 again. Meanwhile, during a warm-up operation immediately after the start of the system, the three-way valve 67 is controlled to be opened or closed so that the coolant flowing out of the fuel cell stack 20 flows through the coolant paths 61, 62, and 63 and then flows into the fuel cell stack 20 again.

The controller 70 is a computer system which is provided with a CPU, ROM, RAM, an input/output interface, etc., and functions as a control unit for controlling the respective portions of the fuel cell system 10 (the oxidant gas supply system 30, the fuel gas supply system 40, the power system 50, and the cooling system 60). For example, when receiving an ignition signal IG output from an ignition switch, the controller 70 starts the operation of the fuel cell system 10, and obtains the power required by the entire system based on an acceleration-opening-degree signal ACC output from an acceleration sensor, a vehicle speed signal VC output from a vehicle speed sensor, etc.

The power required from the entire system corresponds to the total value of vehicle driving power and auxiliary-machine power. The auxiliary-machine power includes, e.g., power consumed by vehicle-mounted auxiliary machines (humidifier, air compressor, hydrogen pump, cooing water circulation pump, etc.), power consumed by devices necessary for vehicle driving (a change gear, wheel control device, steering device, suspension device, etc.), and power consumed by devices arranged in an occupant space (air-conditioning device, illumination device, audio equipment, etc.).

The controller 70 determines an output power distribution ratio of the fuel cell stack 20 and the battery 52 and calculates a power generation command value, and also controls the oxidant gas supply system 30 and the fuel gas supply system 40 so that the power generation of the fuel cell stack 20 corresponds to target power. Moreover, the controller 70 controls the DC/DC converter 51 to adjust the output voltage of the fuel cell stack 20, thereby controlling the operation point (output voltage and output current) of the fuel cell stack 20. In order to obtain a target torque in accordance with an acceleration opening degree, the controller 70 outputs, for example, respective AC voltage command values of a U-phase, a V-phase, and a W-phase as switching commands to the traction inverter 53, and controls the output torque and revolution speed of the traction motor 54.

Figure 2:
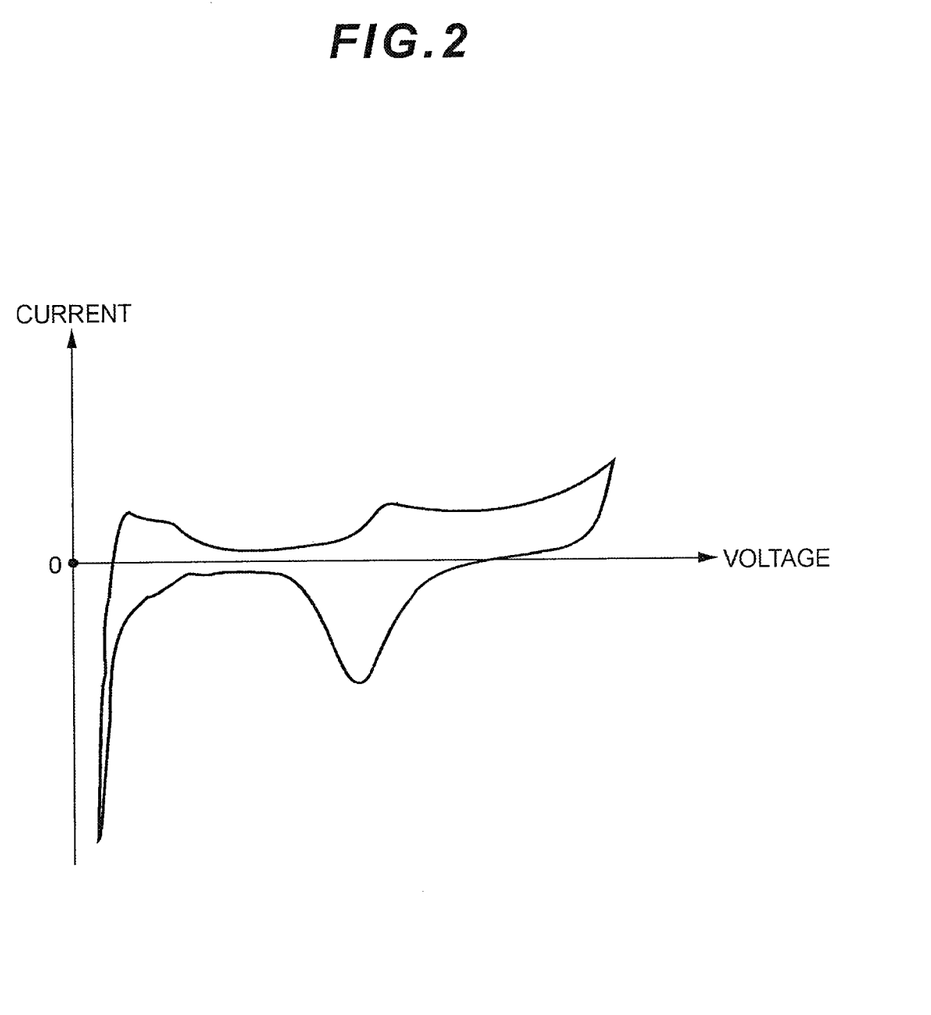
FIG. 2 is a diagram illustrating C-V characteristics of a fuel cell stack.

FIG. 2 illustrates C-V characteristics (cyclic voltammogram) of the fuel cell stack 20.

The C-V characteristics indicate dynamic electrical characteristics of the fuel cell stack 20. When the voltage of the fuel cell stack 20 is increased with a fixed voltage increase rate, a current flows in the direction in which the current flows from the outside into the fuel cell stack 20 (minus direction); meanwhile, when the voltage of the fuel cell stack is decreased at a fixed voltage decrease rate, a current flows in the direction at which the current flows from the fuel cell stack 20 to the outside (plus direction). It has been found that such dynamic characteristics derive from a capacitance component contained by the fuel cell stack 20 in a parasitic manner.

Here, when a generated current is increased/decreased rapidly, an ohm voltage drop, which results from an ohm resistance of an electrolyte membrane Of each cell constituting the fuel cell stack 20, follows the change of the generated current with high response property. However, an activation overvoltage caused in an electric double layer cannot follow the change of the generated current with high response property, and slowly settles in an equivalent state for a certain amount of time. The reason for the above difference is that, while the electrical characteristics of the electrolyte membrane 22 can be modeled as a resistive element, the electrical characteristics of the electric double layer can be modeled as a capacitor.

Figure 3:
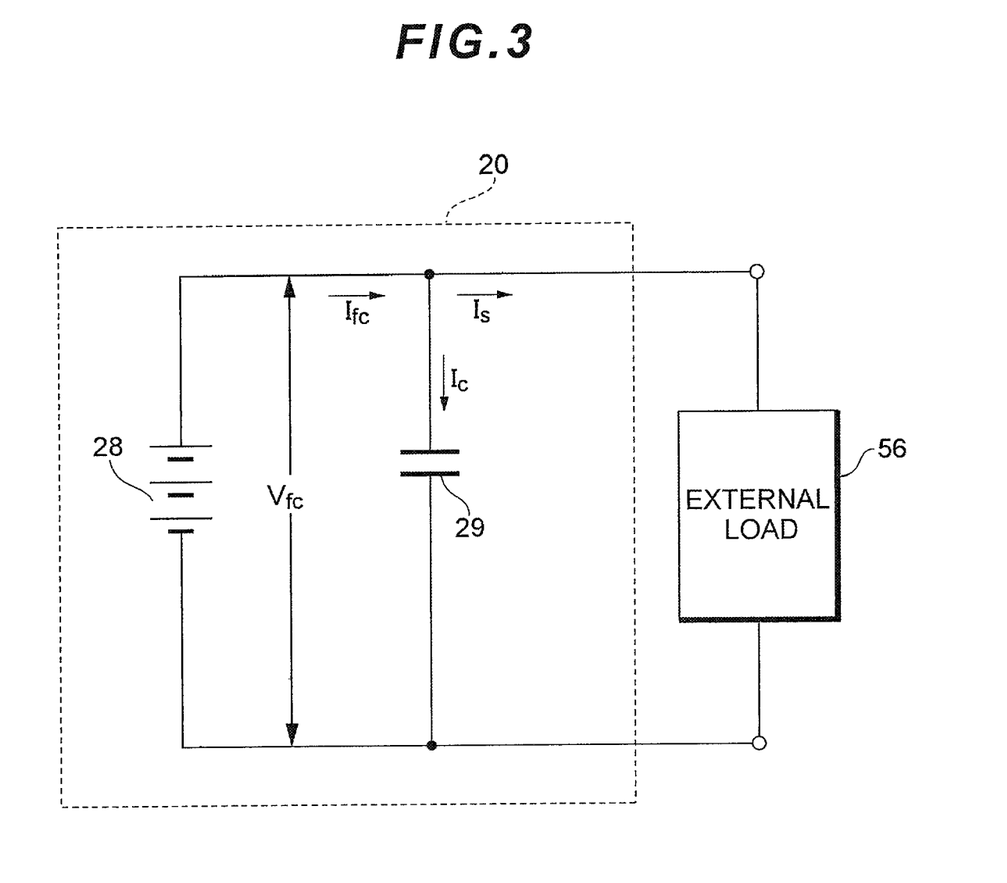
FIG. 3 is an equivalent circuit diagram of the fuel cell stack.

FIG. 3 is an equivalent circuit diagram showing a model which represents dynamic electrical characteristics of the fuel cell stack 20.

The fuel cell stack 20 has a circuit configuration in which an ideal fuel cell 28 and a capacitor 29 are connected in parallel. The ideal fuel cell 28 is a model of a virtual fuel cell not having the above-described C-V characteristics, and behaves in an equivalent manner to a variable power supply in terms of electrical characteristics. The capacitor 29 is a model of a capacitor element which represents electrical behaviors of the electrical double layer formed on a boundary surface. An external load 56 is a model of an equivalent circuit which represents the power system 50. Assuming that: a current flowing out of the ideal fuel cell 28 is Ifc; an output voltage of the ideal fuel cell 28 (output voltage of the fuel cell stack 20) is Vfc; a current flowing into the capacitor 29 is Ic; a current flowing out of the fuel cell stack 20 to the external load 56 is Is; a capacitance of the capacitor 29 is C; and time is t, equations (4) and (5) shown below are satisfied.

$$Ifc = Ic + Is \quad (4)$$

$$IC = C \cdot \Delta Vfc / \Delta t \quad (5)$$

As shown in equations (4) and (5), when the output voltage Vfc is raised, the current is flowing into the capacitor 29 increases in accordance with the change amount per unit time $\Delta Vfc/\Delta t$, and therefore, the current Is flowing out of the fuel cell stack 20 to the external load 56 decreases. On the other hand, when the output voltage Vfc is lowered, the current Ic flowing into the capacitor 29 decreases in accordance with the change amount per unit time $\Delta Vfc/\Delta t$, and therefore, the current Is flowing out of the fuel cell stack 20 to the external load 56 increases. In this way, the current Is flowing out of the fuel cell stack 20 to the external load 56 can be adjusted by controlling the voltage increase/decrease of the output voltage Vfc per unit time (for convenience, hereinafter referred to as $\Delta V$ control).

An application example of the $\Delta V$ control is a method of, when power generation required for the fuel cell stack 20 is rapidly decreased during a low-efficiency operation, having the capacitor 29 absorb surplus power via the control of the output voltage Vfc. The low-efficiency operation refers to an operation with a low power generation efficiency which is achieved by controlling the supply of reaction gases to the fuel cell stack 20 with an air stoichiometry ratio set to less than 1.0 so as to increase power loss. The air stoichiometry ratio refers to the ratio of excessive oxygen, which indicates to what extent supply air is excessive relative to the oxygen required to react with hydrogen in an equal proportion.

When the low-efficiency operation is carried out with an air stoichiometry ratio being set low, the concentration overvoltage becomes large compared with a normal operation. Therefore, there is an increase in heat loss (power loss) of energy that can be taken out through a reaction between hydrogen and oxygen.

The low-efficiency operation is carried out at a start preparation step before vehicle driving or at the time of a warm-up operation performed during vehicle driving, as, e.g., a means for quickly warming up the fuel cell stack 20 by intentionally increasing heat loss at the start of the system at a low temperature (start with a stack temperature equal to or lower than a predetermined temperature).

The low-efficiency operation during vehicle driving is carried out until a stack temperature rises to reach a predetermined temperature (e.g., 0° C.) while keeping the supply of the fuel gas to the fuel cell stack 20 constant, as well as adjusting the flow rate of the oxidant gas to the fuel cell stack 20 so as to obtain the desired power in accordance with an acceleration opening degree. When the stack temperature reaches the predetermined temperature, the operation is switched to a normal operation.

Figure 4:
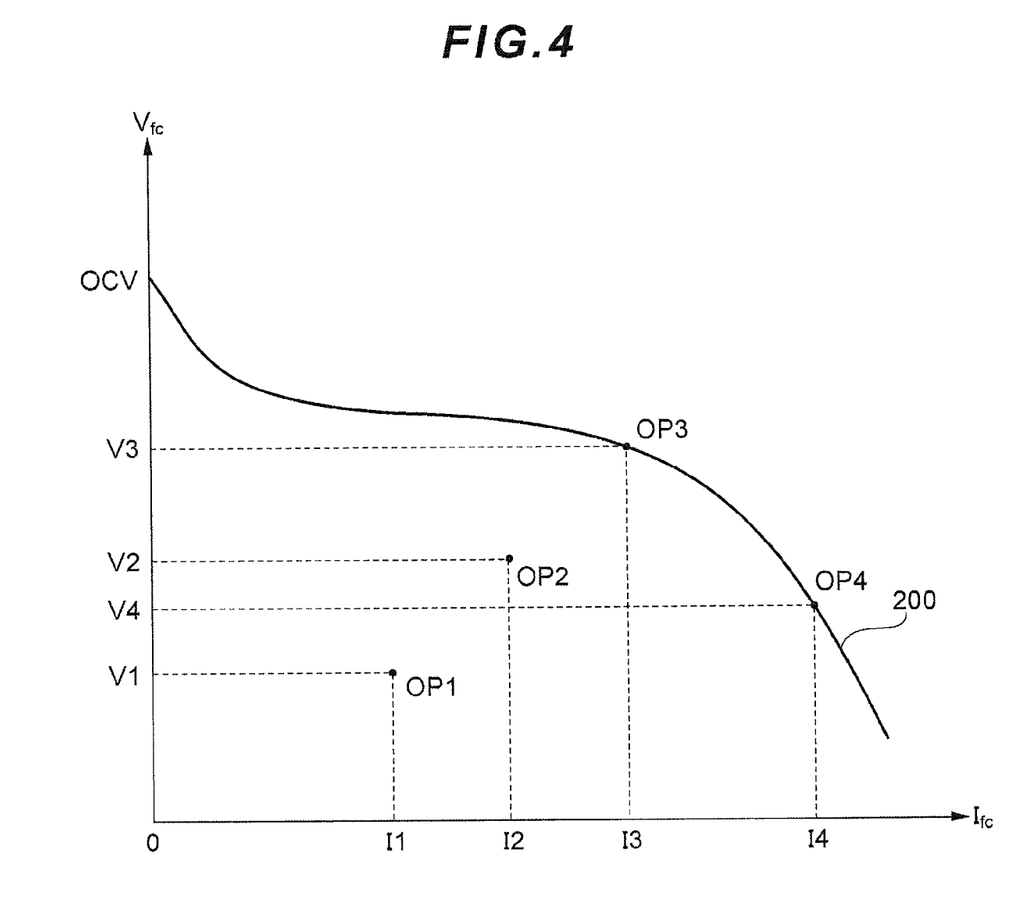
FIG. 4 is an explanatory diagram of operation points of the fuel cell stack.

FIG. 4 shows I-V characteristics of the fuel cell stack 20.

During a normal operation, operation control is performed such that an operation point (output current Ifc, output voltage Vfc) for enhancing power generation efficiency is located on an I-V characteristic curve (current vs. voltage characteristic curve) 200. Meanwhile, during a low-efficiency operation, power generation efficiency is intentionally lowered to enhance heat loss, and therefore, the operation point is set to a low voltage point compared with the I-V characteristic curve, e.g., the output voltage Vfc=V1 or Vfc=V2. Here, a warm-up of the fuel cell stack 20 is carried out not only at the start or stop of a vehicle but also during normal driving. Regarding such a warm-up, the output voltage Vfc should be set as low as possible from the viewpoint of enhancement of heat loss (in other words, enhancement of heat generation). However, for example, the voltage required by the load during vehicle driving (traction motor, various auxiliary machines, etc.) is set high compared with the required voltage at the time of the start of the vehicle, etc. Therefore, the output voltage Vfc of the fuel cell stack 20 during a warm-up operation while driving the vehicle under the low-efficiency operation (e.g., V2 shown in FIG. 4) is set high compared with the output voltage Vfc of the fuel cell stack 20 during a warm-up operation at the time of the start or stop under the low-efficiency operation (e.g., V1 shown in FIG. 4).

Here, power generation control is carried out in accordance with a load such that, while the output voltage Vfc of the fuel cell stack 20 during the low-efficiency operation is normally kept constant (e.g., V1 or V2), the output current Ifc is adjusted by controlling the flow rate of the oxidant gas supplied from the air compressor 32 to the fuel cell stack 20 (hereinafter referred to as fixed voltage control). However, output control of the fuel cell stack 20 during a low-efficiency operation is not limited to this. Power generation control may be carried out in accordance with a load such that, while the output voltage Vfc of the fuel cell stack 20 is adjusted in accordance with the voltage required by the load, etc., the output current Ifc is adjusted by controlling the flow rate of the oxidant gas supplied from the air compressor 32 to the fuel cell stack 20.

Operation for Case of Shift from Low-Efficiency Operation to Normal Operation

For example, it is assumed that the operation point during a warm-up operation which is performed while a vehicle is driven under a low-efficiency operation is OP2 (I2, V2). During the warm-up operation, when the temperature sensor 74 detects that the temperature of the fuel cell stack 20 has exceeded a predetermined temperature (e.g., 70° C.), the ECU 70 judges that the time when the operation should be shifted from the low-efficiency operation to a normal operation has come, and performs operation shift processing from the low-efficiency operation to the normal operation. More specifically, by performing the operation shift processing, the operation point of the fuel cell stack 20 is shifted from the operation point OP2 (I2, V2) during the low-efficiency operation to an operation point OP3 (I3, V3) located on the I-V characteristic curve 200. Note that, in the following descriptions, power generation control on the I-V characteristic curve 200 after the shift to the normal operation is referred to as I-V control.

Here, during the shift from the low-efficiency operation to the normal operation, when the output voltage or output current of the fuel cell stack 20 is varied in accordance with the power required by the external load 56 without any consideration of the capacitor 29 that is parasitically present inside the fuel cell stack 20, the power supplied from the fuel cell stack 20 to the external load 56 (the total of the power generated by the fuel cell stack 20 and the power discharged by the capacitor 29) does not match with the power required by the external load 56. This leads to the problems of, e.g., the insufficiency of the power supplied to the external load 56 and the supply of excessive power to the external load 56.

In light of the above, the shift from the low-efficiency operation to the normal operation is performed by carrying out a $\Delta V$ control such that the power supplied from the fuel cell stack 20 to the external load 56 (hereinafter referred to as supply power) and the power required by the external load 56 (hereinafter referred to as required power) do not match with each other. When performing the $\Delta V$ control, the output voltage is raised/lowered while the speed of a voltage change of the output voltage of the fuel cell stack 20 is adjusted such that the supplied power matches with the required power.

Here, the operation shift processing from the low-efficiency operation to the normal operation will be described in detail.

When the ECU (unit for controlling the supply of oxidant gas) 70 determines that the time when the operation should be shifted from the low-efficiency operation to the normal operation has come as described above, the ECU 70 performs processing of increasing the oxidant gas to be supplied from the air compressor 32 to the fuel cell stack 20 by a predetermined amount (e.g., 0.5 mol/s), as preprocessing prior to a shift to the $\Delta V$ control (hereinafter referred to as $\Delta V$ trigger processing). The low-efficiency operation is normally performed in an operation area with a low power generation efficiency compared with the normal operation (area below the I-V characteristic curve in FIG. 4). Therefore, for example, with an increased amount of the oxidant gas to be supplied from the air compressor 32 to the fuel cell stack 20 during the low-efficiency operation, the output current of the fuel cell stack 20 becomes high, and as a result, the output power of the fuel cell stack 20 is increased.

Utilizing this principle, the ECU (derivation unit) 70 detects the output powers before and after the $\Delta V$ trigger processing, calculates an output power deviation Pd, and then compares the output power deviation Pd with a set deviation threshold (power threshold) $\Delta P$. When detecting that the output power deviation Pd has exceeded the deviation threshold $\Delta P$ (when a setting condition is not satisfied), the ECU (judgment unit) 70 regards this as a trigger to carry out the $\Delta V$ control. The ECU 70 then determines a time when the control is switched from the $\Delta V$ control to the I-V control based on the output voltage of the fuel cell stack 20. More specifically, when an output voltage command value of the fuel cell stack 20 is equal to or less than a preset threshold, and this state has continued for or longer than a fixed time, the ECU 70 shifts the operation point to be located on the I-V characteristic curve 200, and starts the I-V control.

Meanwhile, when the output power deviation Pd does not exceed the deviation threshold $\Delta P$, the ECU 70 determines that the time when the $\Delta V$ control is carried out has not come yet. As described above, when determining that the output power deviation Pd has exceeded the deviation threshold $\Delta P$, the ECU 70 regards this as a trigger to carry out the $\Delta V$ control. Therefore, unless the output power deviation Pd exceeds the deviation threshold $\Delta P$, the shift from the low-efficiency operation to the normal operation is not performed (in other words, the I-V control is not performed).

However, there is, for example, the problem in that, even after the temperature of the fuel cell stack 20 reaches a predetermined temperature or higher, which eliminates the need of a warm-up under a low-efficiency operation, the low-efficiency operation is continued with poor power generation efficiency without performing a shift to a normal operation for the reason that the output power deviation Pd does not exceed the deviation threshold P. Accordingly, in this embodiment, if the output power deviation Pd does not exceed the deviation threshold $\Delta P$ for or longer than a fixed time (t>0) after the start of the $\Delta V$ processing (if the setting condition is satisfied), the ECU (judgment unit) 70 automatically starts the I-V control without carrying out the $\Delta V$ control. The I-V control is carried out automatically as described above. The reason that the output power deviation Pd does not exceed the deviation threshold P for or longer than a fixed time after the start of the $\Delta V$ processing is that it can be considered that the operation point during the low-efficiency operation has been on the I-V characteristic curve 200 or, even if not on the I-V characteristic curve 200, in the vicinity of the I-V characteristic curve 200 (see, for example, an operation point OP4 (I4, V4) in FIG. 4).

With such a method, after the warm-up under the low-efficiency operation becomes unnecessary in the state where the operation point during the low-efficiency operation is on the I-V characteristic curve 200, the I-V control (i.e., normal operation) is carried out automatically after a fixed time. Therefore, for example, the above-described problem that, even after the warm-up under the low-efficiency operation becomes unnecessary, the shift to the normal operation cannot be performed, thereby resulting in a continuation of the low-efficiency operation with poor power generation efficiency, can be prevented.

Figure 5:
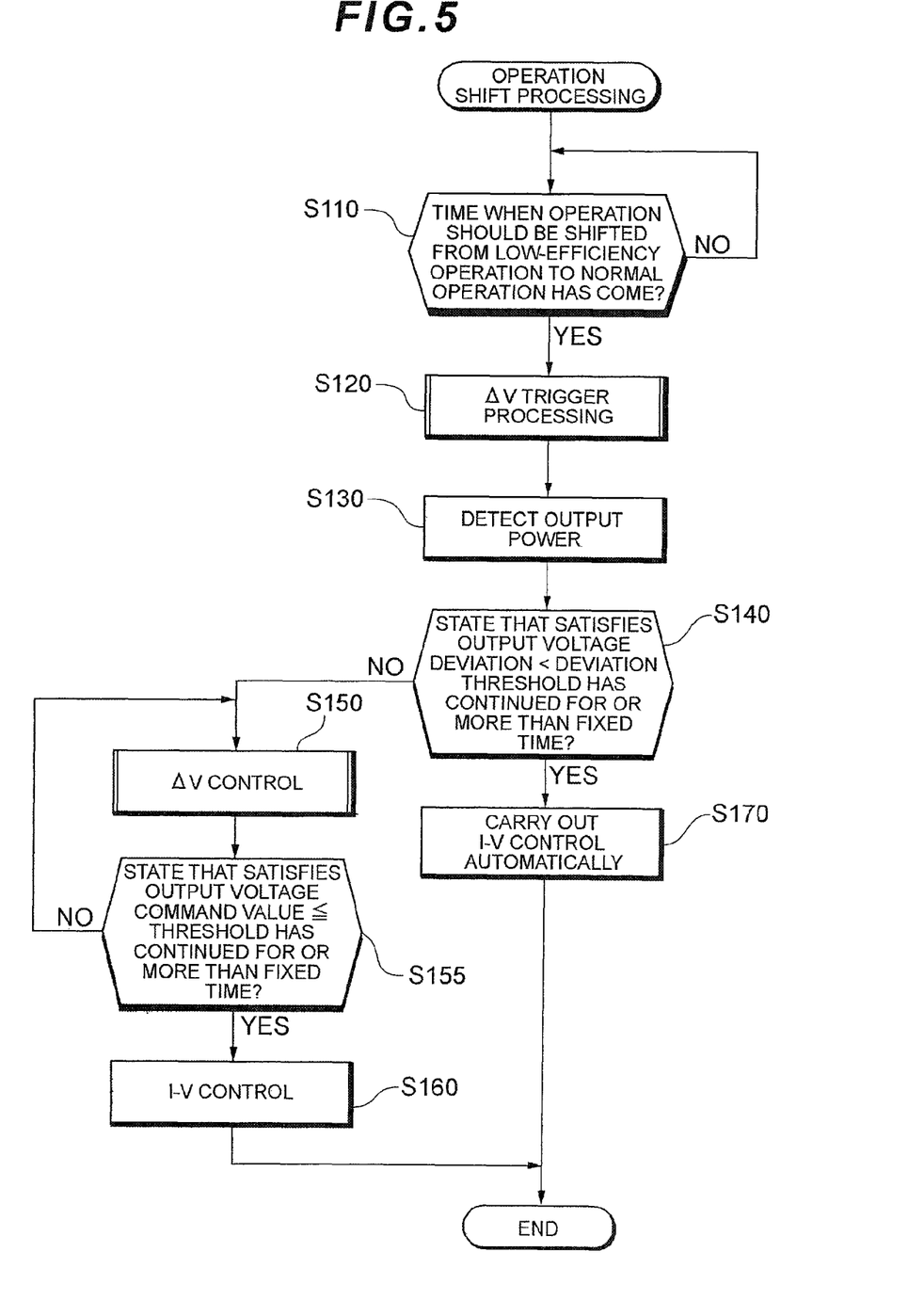
FIG. 5 is a flowchart explaining operation shift processing.

FIG. 5 is a flowchart showing operation shift processing from a low-efficiency operation to a normal operation which is realized by a program executed by the ECU 70. The example of FIG. 5 assumes the case where, during driving, a warm-up is performed under a low-efficiency operation, and the operation is shifted to a normal operation.

For example, in the state where a warm-up is performed during driving under a low-efficiency operation at the operation point OP2 (I2, V2) in FIG. 4, when the temperature sensor (detection unit) 74 detects that the temperature of the fuel cell stack 20 (related temperature) has exceeded a predetermined temperature (70° C.), the ECU (shift judgment unit) 70 determines that the time when an operation should be shifted from the low-efficiency operation to the normal operation has come (Step S110, YES). The ECU 70 determines that the time when an operation should be shifted from the low-efficiency operation to the normal operation has come (Step S110; YES). When determining that the time when the operation should be shifted from the low-efficiency operation to the normal operation has come, the ECU 70 performs the processing of increasing the oxidant gas to be supplied from the air compressor 32 to the fuel cell stack 20 by a predetermined amount (e.g., 0.5 mol/s), as the preprocessing prior to the shift to the $\Delta V$ control (i.e., $\Delta V$ trigger processing) (Step S120). The low-efficiency operation is normally performed in the operation area with a low power generation efficiency compared with the normal operation (area below the I-V characteristic curve in FIG. 4). Therefore, for example, with an increased amount of the oxidant gas to be supplied from the air compressor 32 to the fuel cell stack 20 during the low-efficiency operation, the output current of the fuel cell stack 20 becomes high, and as a result, the output power of the fuel cell stack 20 is increased.

Utilizing this principle, the ECU 70 first detects the output powers before and after the $\Delta V$ trigger processing (Step S130). The ECU 70 then calculates the output power deviation Pd, compares the output power deviation Pd with the set deviation threshold $\Delta P$, and judges whether or not: the output power deviation Pd is below the deviation threshold ΔP; and this state has continued for or longer than a fixed time (Step S140). If the output power deviation Pd is equal to or more than the deviation threshold ΔP, or if the output power deviation Pd is below the deviation threshold ΔP, but this state has not continued for or longer than a fixed time (Step S140; NO), the ECU 70 regards this as a trigger to carry out the ΔV control (Step S150). The ECU 70 then determines the time when the control is switched from the ΔV control to the I-V control based on the output voltage of the fuel cell stack 20 (Step S155). More specifically, when the output voltage command value of the fuel cell stack 20 is equal to or less than the preset threshold, and this state has continued for or longer than a fixed time (Step S155; YES), the ECU 70 shifts the operation point to be located on the I-V characteristic curve 200, and starts the I-V control (Step S160).

Meanwhile, when the output power deviation Pd is below the deviation threshold ΔP, and this state has continued for or longer than a fixed time, the ECU 70 determines that the time when the ΔV control is carried out has not come yet. As described above, when determining that the output power deviation Pd has exceeded the deviation threshold ΔP, the ECU 70 regards this as a trigger to carry out the ΔV control. Therefore, unless the output power deviation Pd exceeds the deviation threshold ΔP, the shift from the low-efficiency operation to the normal operation is not performed (in other words, the I-V control is not performed).

However, there is, for example, the problem that, even after the temperature of the fuel cell stack 20 reaches a predetermined temperature or higher, which makes the warm-up under the low-efficiency operation unnecessary, the shift to the normal operation is not performed since the output power deviation Pd does not exceed the deviation threshold P, thereby resulting in a continuation of the low-efficiency operation with poor power generation efficiency. Accordingly, in this embodiment, if the output power deviation Pd does not exceed the deviation threshold ΔP for or longer than a fixed time (t>0) after the start of the ΔV trigger processing, the ECU 70 automatically starts the I-V control without carrying out the ΔV control (Step S170). The I-V control is carried out automatically as described above. The reason that the output power deviation Pd does not exceed the deviation threshold P for or longer than a fixed time after the start of the ΔV trigger processing is that it can be considered that the operation point during the low-efficiency operation has been on (or in the vicinity of) the I-V characteristic curve 200 (see, for example, the operation point OP4 (I4, V4) in FIG. 4).

With such a method, after the warm-up under the low-efficiency operation becomes unnecessary in the state where the operation point during the low-efficiency operation is on the I-V characteristic curve 200, the I-V control (i.e., normal operation) is carried out automatically after a fixed time. Therefore, for example, the above-described problem that, even after the warm-up under the low-efficiency operation becomes unnecessary, the shift to the normal operation cannot be performed, thereby resulting in a continuation of the low-efficiency operation with poor power generation efficiency, can be prevented.

In the above embodiment, when the output power deviation Pd is below the deviation threshold ΔP, and this state has continued for or longer than a fixed time, the I-V control is automatically carried out without carrying out the ΔV control (Step S140 to Step S170 in FIG. 5). However, for example, when the output power deviation Pd is below the deviation threshold ΔP, the I-V control may be automatically carried out regardless of the continuation time of the above state.

This embodiment assumes the case where the operation is shifted from the low-efficiency operation to the normal operation during driving. However, the embodiment may also be applied to the case of a shift from a low-efficiency operation to a normal operation which is carried out when the system is started or stopped. Also, in this embodiment, whether or not the operation should be shifted from the low-efficiency operation to the normal operation has been judged based on the temperature of the fuel cell stack 20 which is detected by the temperature sensor 74. However, a sensor (detection unit) for detecting the temperatures related to the fuel cell stack 20, such as an environmental temperature in the vicinity of the fuel cell stack, a component temperature and an external air temperature, may be provided, and whether or not the operation should be shifted from the low-efficiency operation to the normal operation may be judged based on the related temperatures detected by that sensor.

B. Second Embodiment

As described in the first embodiment, the output voltage Vfc of the fuel cell stack 20 during the low-efficiency operation is kept constant, and the flow rate of the oxidant gas supplied from the air compressor 32 to the fuel cell stack 20 is controlled, thereby adjusting the output current Ifc, whereby power generation control is performed in accordance with a load (fixed voltage control).

However, in the low-efficiency operation during driving, it has been found that, with the output voltage Vfc kept constant through the fixed voltage control, an area that cannot achieve a set exhaust hydrogen allowable concentration is present depending on the value of the output current Ifc. Accordingly, in this embodiment, multistage fixed voltage control, which can always achieve a set exhaust hydrogen allowable concentration regardless of the value of the output current Ifc during the low-efficiency operation, is carried out. The multistage fixed voltage control refers to control in which: plural values (two values in this embodiment) of the output voltage Vfc are set depending on the output current Ifc without always keeping the output voltage Vfc of the fuel cell stack 20 at a fixed value during the low-efficiency operation in order to achieve the set exhaust hydrogen allowable concentration; and switching of the set output voltages Vfc is performed appropriately.

Figure 6:
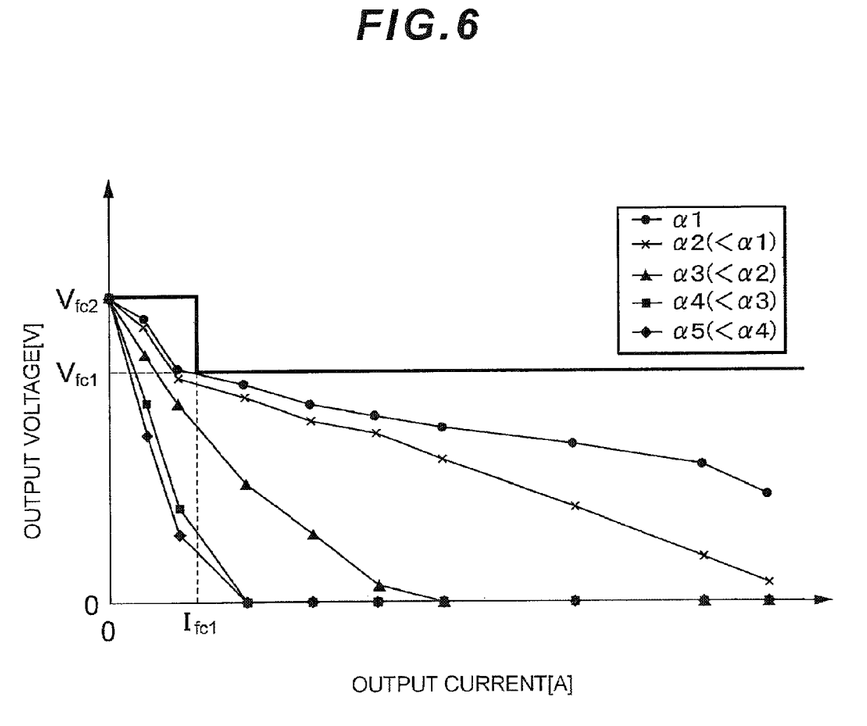
FIG. 6 is a diagram showing output current/output voltage characteristics of a fuel cell regarding the respective temperatures of the fuel cell stack 20.

FIG. 6 is a diagram showing output current/output voltage characteristics of a fuel cell regarding respective temperatures of the fuel cell stack 20.

As shown in FIG. 6, a higher temperature of the fuel cell stack 20 leads to a higher voltage lower limit based on the exhaust hydrogen allowable concentration. In this embodiment, the voltage lower limit based on the exhaust hydrogen allowable concentration is previously set for the case of the highest temperature (here, the case of a temperature T5) through an experiment, etc., and switching of the output voltage Vfc is performed between output voltages Vfc1 and Vfc2 (>Vfc1) in accordance with the output current Ifc in order to achieve the exhaust hydrogen allowable concentration.

Here, when performing switching of the output voltage Vfc between the output voltages Vfc1 and Vfc2, the operation point of the fuel cell stack 20 is shifted using the ΔV control. When performing the ΔV control, if the output voltage Vfc is rapidly raised or lowered (specifically, from Vfc1 to Vfc2, from Vfc2 to Vfc1), the problems of, e.g., the insufficiency of the power supplied to the external load 56 and the supply of excessive power to the external load 56, are caused. Accordingly, when performing the ΔV control, the output voltage is increased/decreased while the voltage change speed of the output voltage of the fuel cell stack 20 is adjusted such that the supply power matches with the required power.

By carrying out the above-described control, the exhaust hydrogen allowable concentration can be satisfied reliably even during the low-efficiency operation, and also, the problems of, e.g., the insufficiency of the power supplied to the external load 56 and the supply of excessive power to the external load 56 can be prevented.

Figure 7:
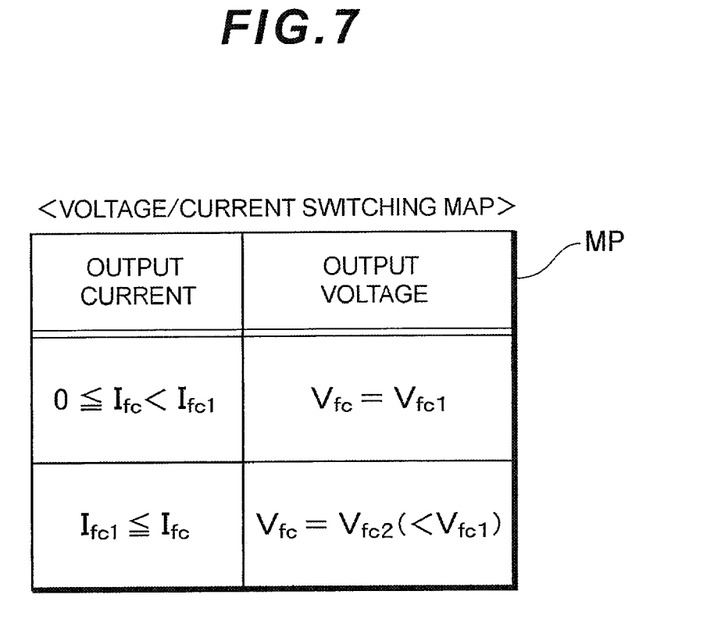
FIG. 7 is a diagram illustrating a voltage/current switching map.

FIG. 7 illustrates a voltage/current switching map MP stored in the ECU (storage unit) 70. The voltage/current switching map MP is a map (exhaust hydrogen concentration information) showing the relationship between the output voltage Vfc and the output current Ifc of the fuel cell stack 20 which can achieve the exhaust hydrogen concentration (exhaust-hydrogen-concentration lower limit). The ECU (judgment unit) 70 refers to the current/voltage switching map MP, and then selects the output voltage Vfc1 if, for example, the output current Ifc is less than the output current Ifc1 (approximately, e.g., 50 A), or selects the output voltage Vfc (<Vfc1) if the output current Ifc is equal to or larger than the output current Ifc1 (see FIG. 6).

Figure 8:
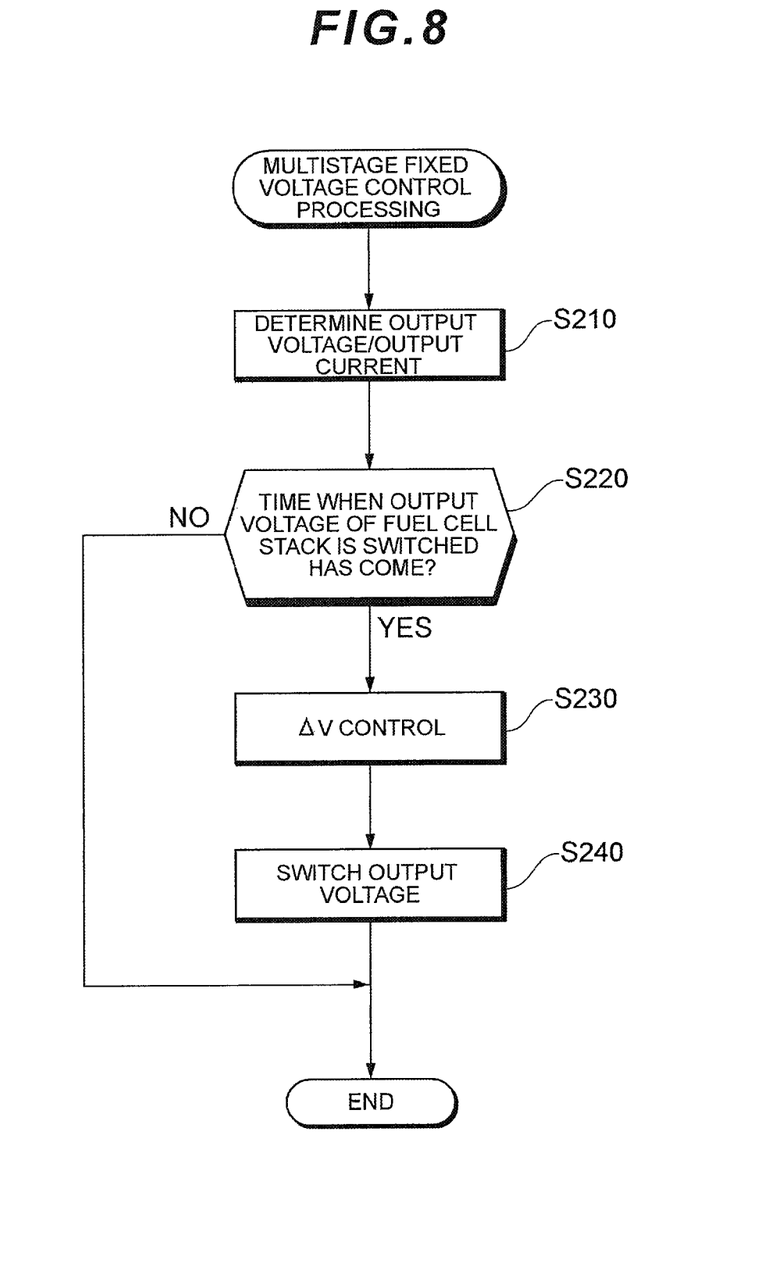
FIG. 8 is a flowchart explaining multistage fixed voltage control processing.

FIG. 8 is a flowchart explaining multistage fixed voltage control processing that is executed by the ECU 70.

When starting a low-efficiency operation, the ECU 70 first determines the output voltage Vfc and the output current Ifc based on the system required power and the current/voltage switching map MP (Step S210).

After that, the ECU (judgment unit) 70 determines whether or not the time when the output voltage Vfc of the fuel cell stack 20 is switched has come while referring to the voltage lower limit based on the exhaust hydrogen allowable concentration shown in FIG. 6 (Step S220). In, for example, the state where the output voltage Vfc2 and the output current Ifc1 are set at the current point, when the output current Ifc needs to be set to be equal to or lower than the output current Ifc1, the ECU 70 determines that the time when the output voltage Vfc of the fuel cell stack 20 is switched has come (Step S220; YES). Then, the ECU 70 switches the output voltage Vfc from the output voltage Vfc2 to the output voltage Vfc1 by performing a ΔV control (Step S230 to Step S240), and ends the processing. Meanwhile, in, for example, the state where the output voltage Vfc2 and the output current Ifc1 are set at the current point, when the output current Ifc does not need to be set to be equal to or lower than the output current Ifc1, the ECU 70 determines that the time when the output voltage Vfc of the fuel cell stack 20 is switched has not come (Step S220; NO), and skips Steps S230 and S240 to end the processing.

As has been described above, according to this embodiment, when performing the low-efficiency operation, the multistage fixed voltage control is carried out with respect to the output voltage Vfc of the fuel cell stack 20 in order to achieve the set exhaust hydrogen allowable concentration, and also, when performing the switching of the output voltage Vfc, the ΔV control is carried out. Accordingly, the exhaust hydrogen allowable concentration can be achieved reliably even during the low-efficiency operation, and also, the problems of, e.g., the insufficiency of the power supplied to the external load 56 and the supply of excessive power to the external load 56 can be prevented.

(1) The above embodiment has described switching of the output voltage Vfc of the fuel cell stack 20 from the low output voltage Vfc2 to the high output voltage Vfc1 (e.g., the reduction of the system required power). On the other hand, this embodiment can also be applied to switching from the high output voltage Vfc1 to the low output voltage Vfc2 (e.g., the increase of the system required power).

(2) The above embodiment has described, as an example of the multistage fixed voltage control, two-stage fixed voltage control between the two output voltages Vfc1 and Vfc2. However, the multistage fixed voltage control may be performed with switching between three or more output voltages. Output voltage control with higher power generation efficiency (or heat generation efficiency) can be carried out by increasing the number of switchable output voltages.

DESCRIPTION OF REFERENCE NUMERALS

10: fuel cell system, 20: fuel cell stack, 30: oxidant gas supply system, 40: fuel gas supply system, 50: power system, 60: cooling system, 70: controller

What is claimed is:

1. A fuel cell system that warms up a fuel cell by carrying out a low-efficiency operation with a low power generation efficiency compared with a normal operation, comprising:
    a voltage control unit programmed to, when a setting condition is not satisfied, shift the operation from the low-efficiency operation to the normal operation by performing a ΔV control, in which an output voltage of the fuel cell is controlled to achieve system required power while considering charge/discharge amounts with respect to a capacitance component of the fuel cell, whereas when the setting condition is satisfied, the operation is automatically shifted from the low-efficiency operation, not through the ΔV control, to the normal operation;
    a supply oxidant gas control unit for increasing an oxidant gas supplied to the fuel cell by a predetermined amount when shifting the operation from the low-efficiency operation to the normal operation;
    a derivation unit programmed to derive an output power deviation of the fuel cell by detecting output power of the fuel cell before and after the increase of the oxidant gas; and
    a judgment unit programmed to make a judgment on whether or not the setting condition is satisfied when shifting an operation from the low-efficiency operation to the normal operation,
    wherein, when the derived output power deviation of the fuel cell is below a set power threshold, the judgment unit is programmed to judge that the setting condition is satisfied.

2. The fuel cell system according to claim 1, wherein, when the derived output power deviation of the fuel cell is below the set power threshold for or longer than a predetermined time, the judgment unit judges that the setting condition is satisfied.

3. The fuel cell system according to claim 1, further comprising:
    a detection unit for detecting a related temperature of the fuel cell; and a shift determination unit for determining whether or not the operation should be shifted from the low-efficiency operation to the normal operation based on the detected related temperature, wherein, when the shift determination unit determines that the operation should be shifted from the low-efficiency operation to the normal operation, the judgment unit makes a judgment on whether or not the setting condition is satisfied.

4. The fuel cell system according to claim 1, wherein the following equations are satisfied when the charge/discharge amounts are considered with respect to the capacitance component of the fuel cell, $$Ifc = Ic + Is;\text{ and}$$

$$Ic = C \cdot \Delta Vfc/\Delta t.$$

5. A fuel cell system that warms up a fuel cell by carrying out a low-efficiency operation with a low power generation efficiency compared with a normal operation, comprising:

a voltage control unit programmed to, when it is judged that an output voltage should be changed, change the output voltage by performing a ΔV control, in which the output voltage of the fuel cell is controlled to achieve system required power while considering charge/discharge amounts with respect to a capacitance component of the fuel cell;

a supply oxidant gas control unit for increasing an oxidant gas supplied to the fuel cell by a predetermined amount when shifting the operation from the low-efficiency operation to the normal operation;

a derivation unit programmed to derive an output power deviation of the fuel cell by detecting output power of the fuel cell before and after the increase of the oxidant gas, and a judgment unit programmed to make a judgment on whether or not the output voltage of the fuel cell should be changed during the low-efficiency operation, wherein, when the derived output power deviation of the fuel cell is below a set power threshold, the judgment unit judges that the output voltage of the fuel cell should not be changed during the low-efficiency operation.

6. The fuel cell system according to claim 5, further comprising a storage unit for storing exhaust hydrogen concentration information representing a relationship between an output voltage and an output current of the fuel cell which satisfies an exhaust-hydrogen-concentration lower limit, wherein the judgment unit makes a judgment on whether or not the output voltage of the fuel cell should be changed during the low-efficiency operation based on the exhaust hydrogen concentration information.

* * * * *

UNITED STATES PATENT AND TRADEMARK OFFICE
CERTIFICATE OF CORRECTION

PATENT NO. : 8,795,915 B2  
APPLICATION NO. : 12/810131  
DATED : August 5, 2014  
INVENTOR(S) : Hiroyuki Imanishi et al.

Page 1 of 1

It is certified that error appears in the above-identified patent and that said Letters Patent is hereby corrected as shown below:

In the Specification

At column 2, line 26, change "condition, is not" to -- condition is not --.

At column 7, line 23, change "current is flowing" to -- current Ic flowing --.

In the Claims

At column 14, line 43, Claim 1, change "through the AV control," to -- through the ΔV control, --.

Signed and Sealed this  
Sixteenth Day of June, 2015

Michelle K. Lee  
*Director of the United States Patent and Trademark Office*